United States Patent [19]
Whitley

[11] 3,845,609
[45] Nov. 5, 1974

[54] TOBACCO PRIMER
[76] Inventor: Andrew Whitley, Rt. 2, Box 72, Zebulon, N.C.
[22] Filed: Oct. 6, 1972
[21] Appl. No.: 295,711

[52] U.S. Cl.................... 56/27.5, 56/126, 56/330
[51] Int. Cl........................................... A01d 45/16
[58] Field of Search ........... 56/27.5, 126, 130, 330, 56/331, 327 A

[56] References Cited
UNITED STATES PATENTS
3,507,103  4/1970  Pickett et al........................ 56/27.5
3,665,689  5/1972  Richardson......................... 56/27.5

Primary Examiner—Antonio F. Guida
Assistant Examiner—J. N. Eskovitz
Attorney, Agent, or Firm—Mills and Coats

[57] ABSTRACT

In abstract, a preferred embodiment of this invention is a tobacco harvesting machine for attachment to a tractor for automatically removing leaves from a portion of the tobacco stalk and conveying such leaves to a container.

6 Claims, 9 Drawing Figures

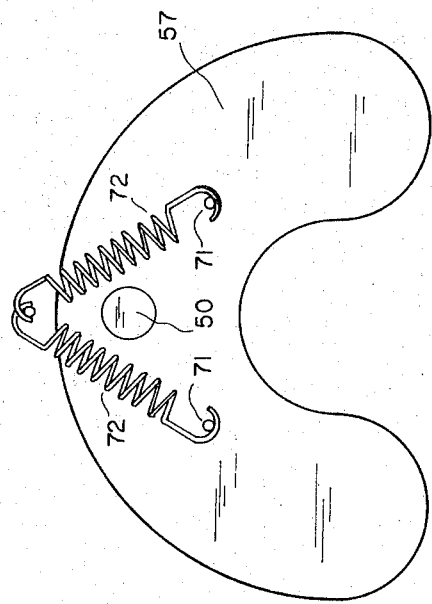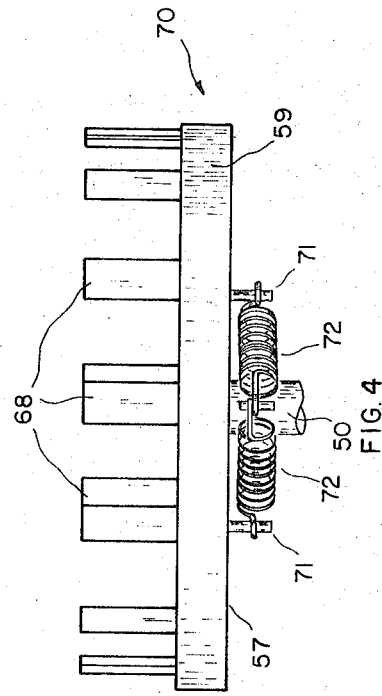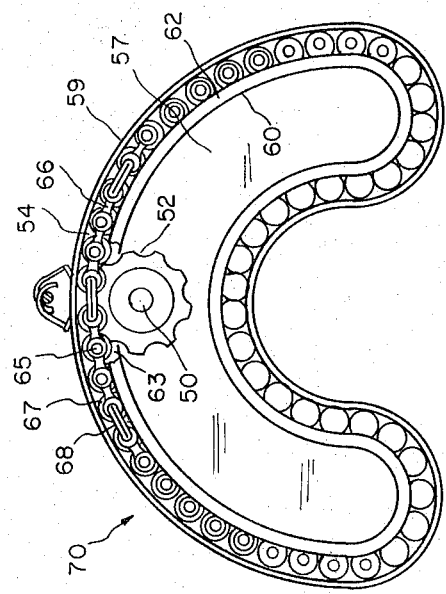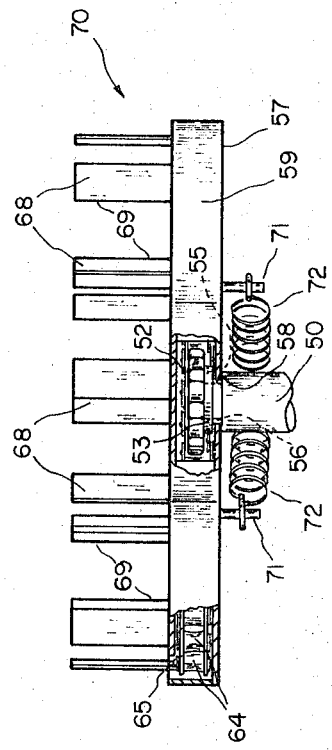

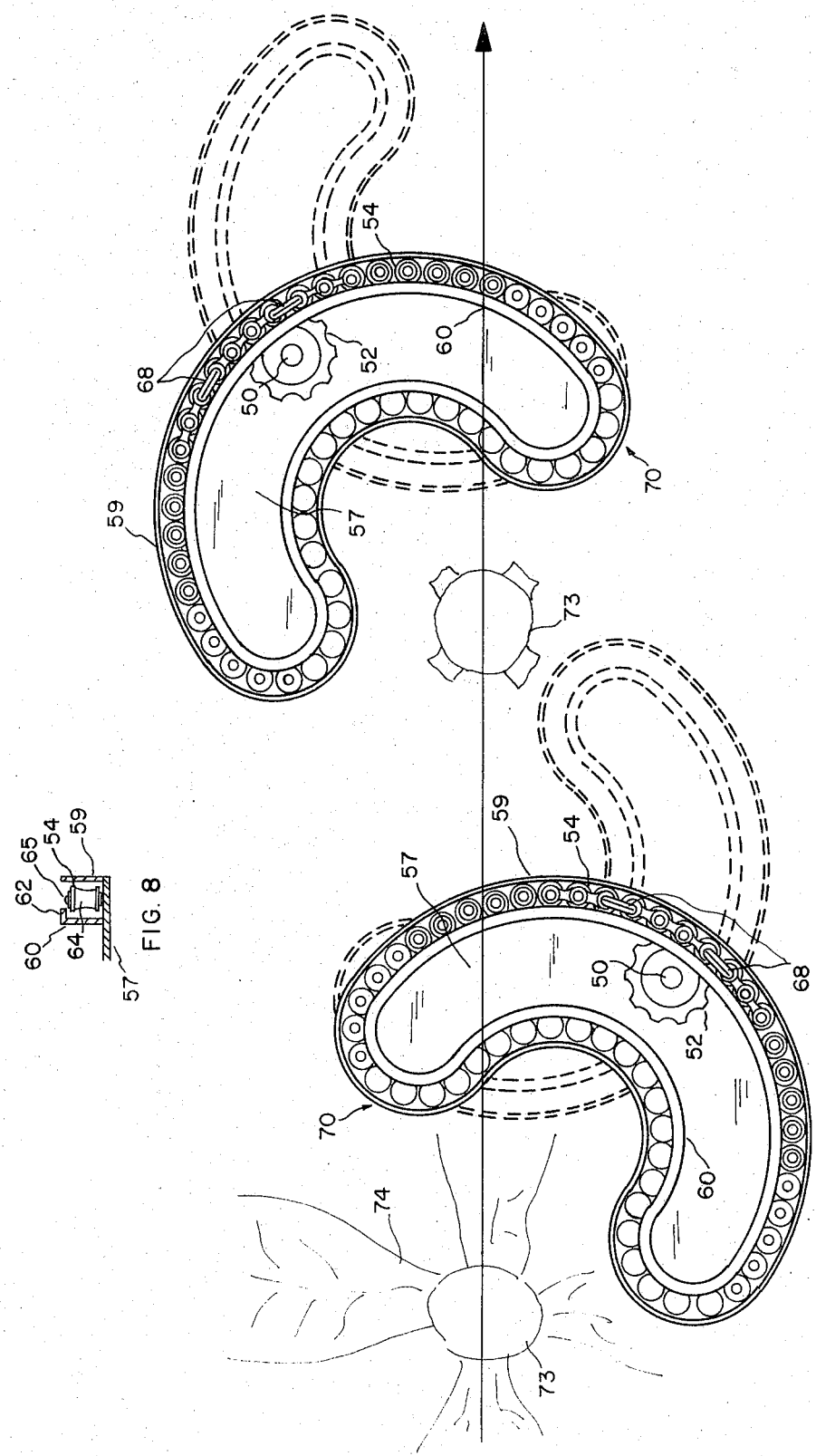

TOBACCO PRIMER

This invention relates to harvesting devices and more particularly to automatic priming devices for tobacco type crops.

In the past, various attempts have been made to develop practical means for removing the ripe leaves from tobacco stalks, automatically, without using hand labor. These various attempts have, for one reason or another, been impractical or inoperative and none have been used successfully on a commercial scale. These attempts have included arms for breaking the tobacco leaves off of the stalk, wipers for wiping such leaves from the stalks and similar methods. The shape and configuration of these devices taken in combination with the conveying means have produced either ineffectual apparatuses or have so damaged or bruised the leaves being harvested that they are unacceptable in the market place.

After much research and study into the above mentioned problems, the present invention has been developed to provide a simple, inexpensive and yet highly effective mechanism for automatically priming or removing of tobacco leaves from tobacco stalks in the field and conveying the thus harvested tobacco leaves to a receiving area, automatically and without hand controlled operation. This improved harvester is efficient not only in automatically removing and conveying the tobacco but it does so without crushing, breaking or otherwise mutilating or injuring the same.

In view of the above, it is an object of the present invention to provide an improved automatic harvesting and conveying system for tobacco type leaf crops.

Another object of the present invention is to provide an automatic tobacco priming device including means for cutting the leaves adjacent the stalk without damaging the leaves.

Another object of the present invention is to provide an automatic tobacco priming device including a mechanism for plainly and accurately breaking the leaves from the stalk prior to conveying such leaves to a central point.

A further object of the present invention is to provide an automatic tobacco priming and conveying system including a ground wheel driven power source.

An even further object of the present invention is to provide a tractor towed, self-standing automatic tobacco harvesting and conveying mechanism.

An additional object of the present invention is to provide a chain driven, continuously rotating means for automatically priming tobacco from tobacco stalks.

Another object of the present invention is to provide an automatic tobacco harvesting device which is readily adjustable as to height of operation.

Other objects and advantages of the present invention will become apparent and obvious from a study of the following description and the attached drawings which are merely illustrative of such invention.

IN THE DRAWINGS

FIG. 3 is a top plan view of such mechanism;

FIG. 4 is a front elevational view of the same;

FIG. 5 is a rear elevational view of such mechanism;

FIG. 6 is a bottom plan view of the cutting mechanism taken through lines 6—6 of FIG. 4;

FIG. 7 is a top plan view of the cutting mechanism disclosing the movement of such mechanism as the tobacco stalks passes thereby;

FIG. 8 is a sectional view taken through lines 8—8 of FIG. 3; and

With further reference to the drawings, the automatic tobacco harvester of the present invention, indicated generally at 10, includes a forward, generally inverted U-shaped frame member 11 which is reinforced by cross member 11'. A rear, generally inverted U-shaped member 12 is provided, such frame member being similar to member 11.

Figure 1:
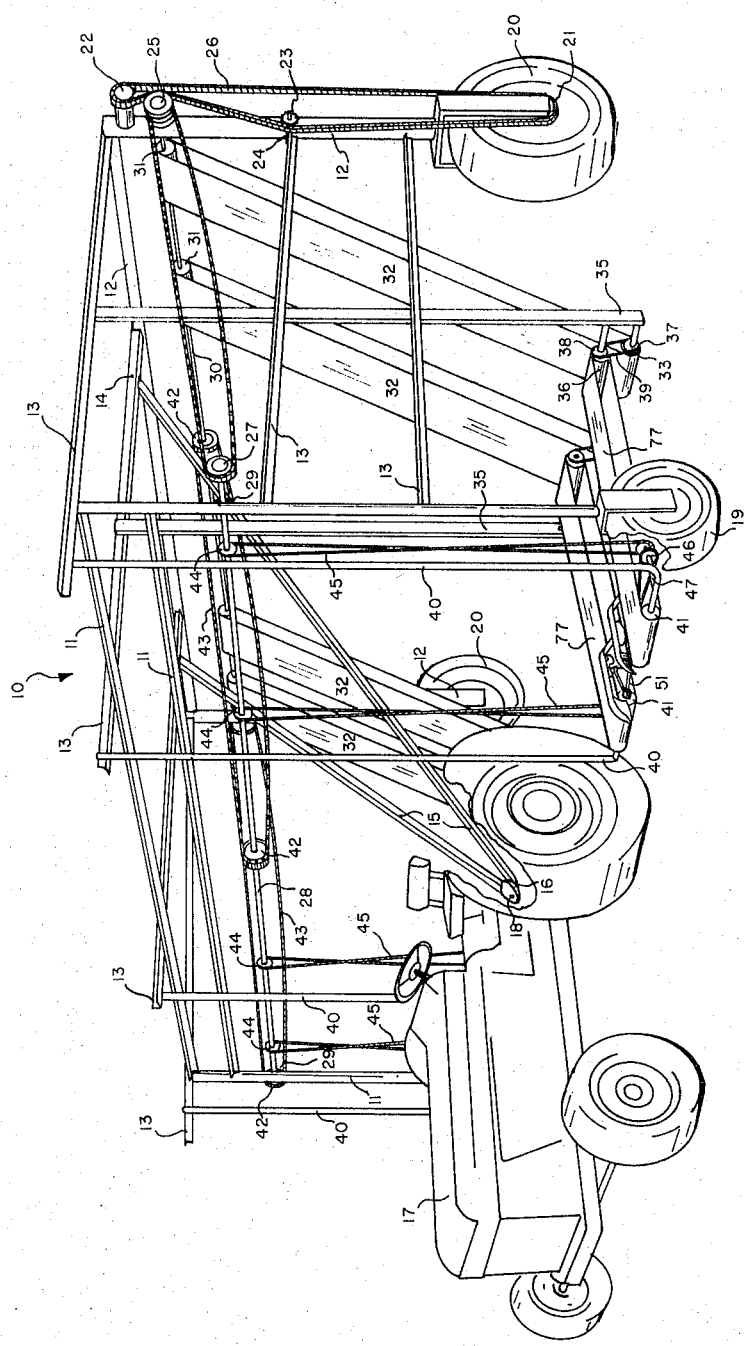
FIG. 1 is a perspective view of the harvester of the present invention and operative attachment with a standard farm type tractor.
Figure 2:
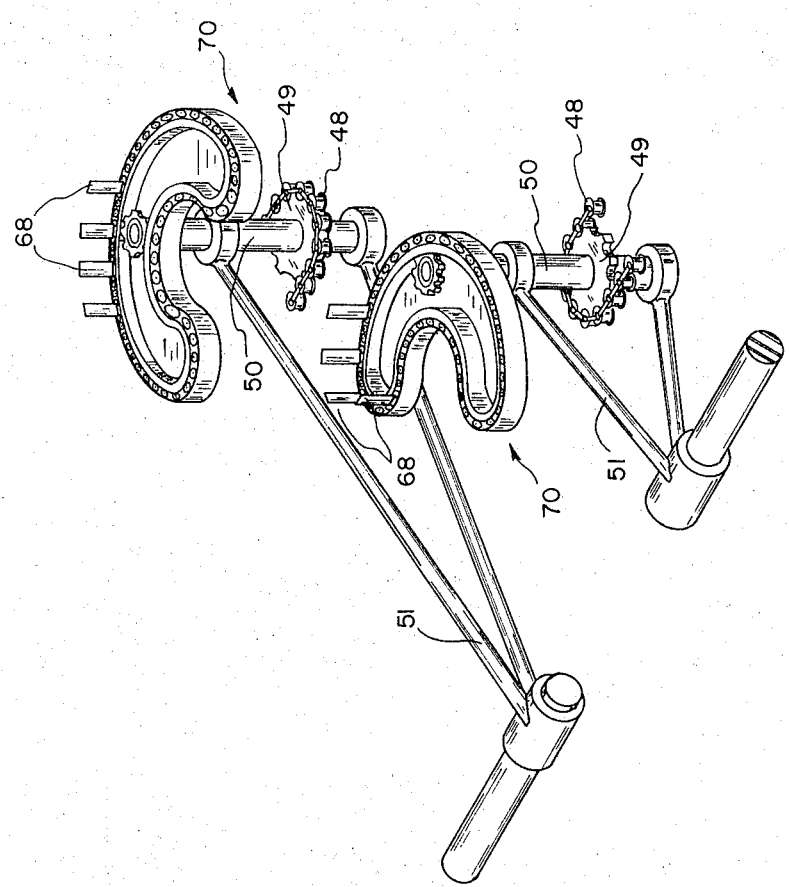
FIG. 2 is an enlarged perspective view of the tobacco leaf cutting mechanism of the present invention.

Fixedly attached to and extending between frame members 11 and 12 are a plurality of cross members 13. These cross members, as can clearly be seen in FIG. 1, give rigidity to the overall frame.

Pivotably secured by means such as pins 14 or fixedly secured by means (not shown) is a generally V-shaped tongue 15 terminating at its vertex in a hitch portion 16. This portion is adapted to be releasably connected to tractor 17 by standard connecting means such as pin 18.

The lower portion of frame member 11 terminates in caster type wheels of standard configuration. The rear, generally U-shaped frame member 12 terminates at each end in a rotatively mounted, preferably nonswivel type wheel 20. At least one of these last two mentioned wheels has a sprocket 21 fixedly secured thereto thus allowing such wheel to be a drive wheel for the harvesting apparatus 10.

An idler sprocket 22 is provided in the upper portion of frame member 12 and a position adjustable tensioning idler sprocket 23 is rotatively mounted therebelow. This last mentioned sprocket is preferably adjustably attached to one of the cross members 13 by means such as bolt 24. Operatively trained about sprockets 21, 22 and 23 is a drive chain 26. This drive chain can also train about a portion of double idler sprocket 25. The second half of this last mentioned sprocket has trained about it drive chain 43 which also trains about sprocket 27 fixedly mounted on the end of drive shaft 28. This last mentioned drive shaft is rotatively secured to frame 11 by means such as bearing blocks 29.

The double sprocket 25 hereinabove referred to is fixedly secured to rear drive shaft 30. This drive shaft is rotatively mounted similar to shaft 28 and extends across frame 12.

Fixedly secured to shaft 30 are a plurality of conveyor belt drive rollers 31. Each of these rollers carry an inclined conveyor belt 32 which is adapted to also travel about drive rollers 33. These last mentioned rollers are preferably rotatively mounted on a fixed shaft 34 which is dependingly supported by means such as arms 35 from the harvester cross members 13 as seen particularly in FIG. 1.

Disposed adjacent to and parallel with shaft 34 is a second shaft 36 which rotatively carries driven rollers 36. Sprockets 37 and 38 are fixedly secured to rollers 33 and 36, respectively, and are adapted to have trained thereabout chains 39.

From the forward portion of harvester 10 are a pair of generally L-shaped members depending preferably from cross members 13. These last mentioned members 40 have mounted on the lower, generally horizontal portion thereof idler conveyor rollers 41. Generally horizontally disposed conveyor belts 42 are carried between respective driven rollers 36 and idler roller 41 as seen clearly in FIG. 1.

To give even power distribution and to prevent shaft twisting due to overload one or more sets of sprockets and connecting drive chains can be used between drive shafts 28 and 30. Examples of such drive means are shown in FIG. 1 as shaft mounted sprockets 42 and auxiliary drive chains 43.

It should at this point be noted that only one ground engaging drive wheel should be used since turning of the harvester would put a rotative drive differential into the system during turns if two drive wheels were used at once, one on each side of the device. It is, of course, anticipated that if additional drive is needed, either a second drive wheel with a differential type gear box or standard drive from the power take-off of the tractor could be used. A preferred drive is, of course, shown in FIG. 1.

A plurality of cutter mechanism drive sprockets 44 are fixedly secured at varying intervals to forward drive shaft 28. Over each of these drive sprockets 44 is trained a cutter mechanism drive chain 45 which is, at its lower end, trained over a double sprocket 46 which is rotatively mounted on bracket 47 secured to depending frame member 40. Each alternate cutter drive chain 45 is trained with an opposite twist so that the cutter blades themselves (hereinafter to be described in more detail) will travel in the proper direction.

The second portion of each of the double sprockets 46 have trained thereabout a drive chain 48 which also trains about sprockets 49. These last mentioned sprockets are fixedly secured to the end of their respective cutter drive shafts 50. These last mentioned drive shafts are each rotatively supported by respective mounting brackets 51 which are in turn fixedly secured to respective depending frame members 40. On the upper end of each of the cutter drive shafts 50 is fixedly secured a cutter drive sprocket 52. Directly below the cutter drive sprocket 52 is a spacer 53 which allows such sprocket to be held in proper engaged position with cutter chain 54 as seen particularly in FIG. 5.

Shaft 50 terminates in a necked-down portion 55 which passes through opening 56 and cutter head housing plate 57. From the above, it can be seen that a shoulder 58 is formed adjacent the end of shaft 58 and on this shoulder pivotably rides housing plate 57.

About the periphery of housing plate 57 is an outer channel wall 59. Parallely spaced inwardly from outer wall 59, and secured to housing plate 57, is an inner-channel wall 60. These channel walls form a channel in which cutter chain 54 is adapted to slidingly travel as it is driven by sprocket 52 as will hereinafter be described in more detail.

To prevent cutter chain 54 from becoming dislodged from channel 61 during operation of the cutter mechanism of the present harvesting device, a lip or projection 62 is provided about the channel periphery of inner-channel wall 60 as seen particularly clear in FIG. 8. The cutter chain 54 can be inserted into the thus partially enclosed channel 61 through drive sprocket opening 63 of inner-channel wall 60 and then a standard chain connecting link (not shown) used to form such chain into an endless drive means.

Standard drive chains composed of rollers 64 carried on pins 65 which pass through alternate upper and lower links 66 and 67 have been found adequate for the purposes of the present invention. At intervals, to upper links are fixedly secured upwardly disposed (as oriented in the drawings) cutter blades 68. These blades can be welded or otherwise secured to their respective links and preferably would be sharp along both longitudinal edges 69 so that the cutter heads indicated generally at 70 can be used on either side of the stalk as will hereinafter be described.

Downwardly projecting, as oriented in the drawings, from housing plate 57 are a pair of spring engaging pins 71. Attached to each of these pins is a biasing spring 72. The opposite ends of the biasing spring are secured to bracket 47. Thus it can be seen that when the pair of springs 72 are in equal tension, the cutter head 70, which pivots about shaft 50 by way of opening 56, will be in a static or rest position. Regardless of the direction in which the cutter head is pivoted by crop stalks, it will always return to such rest position. This swiveling or pivoting with biased return will be hereinafter described in further detail relative to the operation of the harvester of the present invention.

Figure 9:
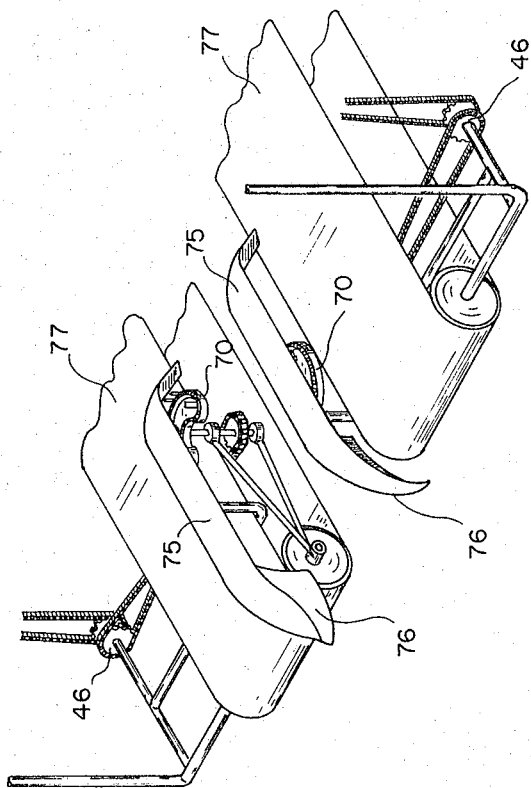
FIG. 9 is a perspective view of the protective covers used in conjunction with the cutting mechanism.

Although for clarity purposes the guard covers 75 and entrance guides 76 are not shown installed on the harvesters 10 of FIG. 1, these guards and guides are shown clearly in the cutaway perspective of FIG. 9.

In actual operation of the harvester of the invention, the hitch portion 16 is used to attach the harvester to a prime mover such as standard tractor 17. Once the tractor is connected to the harvester, the same is ready for operation.

As the tractor moves across the field, the rows of tobacco plants are aligned with the opening between conveyors 77. If the rows are other than a standard width apart, all of the various depending members supporting the network of conveyors and cutting heads can be moved or adjusted laterally, inwardly or outwardly, to the proper spacing. Along the same line, additional rows can be added by laterally extending the harvester framework. The two row harvester presented in FIG. 1 is, of course, for illustrative purposes only.

Once the proper row distance adjustment has been made, the prime mover or tractor 17 moves the harvester across the field. The drive wheel 20, as it turns, drives chain 26 which through the associated sprockets and shaft 30 causes conveyor 32 to move rearwardly and upwardly. Through chains 39 and their associated sprockets the upper portion of conveyor 77 is also driven in a rearwardly direction relative to the harvester 10.

Basic drive chain 26, in addition to driving conveyors 77 and 32, by way of chains 43 and their associated sprockets, drives shaft 28. From this shaft is driven cutter mechanism drive chains 45 and 48 and their associated sprockets and thus cutter head 70 by driving such heads' shaft 50. As this last mentioned shaft is turned, its associated sprocket 52 drives chain 54 within the groove or channel formed between walls 59 and 60. As chain 54 moves in its channel, blades 68 secured thereto are carried around the periphery of the cutter head.

As the first plants of each row are approached by the harvester 10, the vertical height of the cutter heads 70 are set by adjusting the height of the depending members 40 and, if necessary, depending members 35. All of these members are preferably bolted to cross members 13 and by providing a plurality of openings in the depending members, proper height adjustment can be made. It is, of course, obvious that other means such as telescoping depending member could just as well be used as the height adjustable means. Also if it is found that a greater, more controllable height adjustment is needed or desirable, a hydraulic piston can be used in the frame to move the conveyors and associated cutter heads up and down as necessary. Since this type of height adjustment is considered within the capabilities of those skilled in the art, further discussion thereof is not deemed necessary.

Once the proper height adjustments have been made for the cutter heads and associated conveyors, the rows of plants to be harvested are approached. Since tobacco is harvested by removing or "priming" the bottom leaves of the plant, the height adjustment of the automatic harvester will be at approximately the stem level of the lower leaves. As the stalk of the automatic harvester, relatively speaking, passes through the cutting area it is channeled by vertical guides 76. Since the forward part of these guides are inclined upwardly and rearwardly, as leaves are encountered they slide upwardly onto the upper surface of guard 75. This guard, of course, prevents the leaves themselves from becoming engaged with the moving blades 68 of the cutter heads 70.

As the stalk portion of the tobacco plant moves into the leaf priming area, such stalk will engage wall 59 of the first cutter head 70. Since blades 68 are spaced relatively closed to each other and are moving it a relatively rapid rate, any leaf stems that project outwardly and upwardly from the stalk adjacent the area of contact with the cutter head will be severed.

Since leaves grow from all sides of the stalk, as the harvester moves forward and thus the stalk moves relatively through the harvester, cutter heads 70 will pivot about shaft 50 thus as the stalk leaves any given head, such head will have pivoted approximately 90 degrees and, the U-shape of the head being considered, cutting action will have been accomplished about approximately three-fourths of the circumference of the stalk.

Since springs 72 biase the U-shaped cutting head to a position where the end portions are generally forwardly facing in rest position, such biase will return such head to the forwardly facing position when it has been pivoted by a stalk to a rearwardly facing position as seen clearly in FIG. 7. It should also be noted in this Fig. that the arrow gives the relative directional movement of the stalks through the cutting area of the harvester.

As the stalk leaves the first engaged cutting head, it will immediately thereafter engage a second cutter head 70 on the opposite side of its relative line of travel. The same process of the U-shaped head pivoting and therefore working its way around the stalk with an ever present cutting action by blades 68 removes leaves from the area left by the first head. Again, as the stalk passes from the second head, the same, because of the biase of the springs 72, will move back to the stalk receiving position ready for the next plant encounter.

From the above, it can be seen that the leaves themselves are at all times protected beneath guard 75 during the cutting operation and that only that part of the blades 68 that are actually adjacent the stalk itself and are thus cutting the leaf stem protruded out from under such guard. As mentioned above, since leaves grow upwardly and outwardly from a stalk, there is no danger of leaf mutilization but, to the contrary, the leaf itself is above the cutting operation and being protected by the guard. As soon as the blades 68 sever a leaf, because of its large, broad shape, it will immediately become engaged by the adjacent conveyor belt 77 and be moved rearwardly away from the cutter head area. As the leaf reaches the rear portion of conveyor 77, it is automatically transferred to conveyor 32 which moves such leaf upwardly and rearwardly to an elevated position. At this point, the leaf can either be removed from the harvester or can be placed, either manually or mechanically, in a container such as a bulk curing rack (not shown). It is contemplated that either a trailer (not shown) can be connected behind the harvester 10 on which processing stations can be carried or a deck (not shown) can be provided on the upper portion of the frame of harvester 10 to carry such stations. For the purpose of the present invention, it is the automatic harvesting aspects that are considered of utmost importance and not the processing stations.

From the above description, it is obvious that the present invention obtains a cutting action 360 degrees about the stalk of tobacco being harvested and thus will remove all of the leaves in an area equivalent to the height of the blades 68. The length of these blades can, of course, be increased or decreased as desired to remove a greater or lesser section of leaves from the stalks. It is also obvious from the above description that, as the stems of the leaves are cut from the stalk, the leaves themselves are not cut, slashed or otherwise mutiliated but are well protected by guard 75. It is further obvious that the present invention is extremely efficient in removing the leaves from all sides of a tobacco stalk without injuring the leaves themselves and yet is relatively inexpensive to produce and maintain. It is additionally obvious that the present invention is extremely efficient in operation and will allow complete elimination of hand priming of tobacco.

The present invention may of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A leaf removing and cutter head assembly for removing leaves from the stalk of tobacco type plants comprising: a housing plate means; a plurality of wall means forming a channel extending endlessly about the periphery of said plate means; an endless cutter support means carried within said channel; at least one cutter means attached to said support means; and means to drive said support means in an endless path whereby leaves coming into contact with said cutter means will be severed from said stalk.

2. The leaf removing and cutter head assembly of claim 1 including a protective guard mounted adjacent said plate means and covering a portion of the path travel of said cutter means.

3. The leaf removing and cutter head assembly of claim 1 wherein the periphery of said plate means is generally U-shaped in configuration.

4. The leaf removing and cutter head assembly of claim 1 wherein at least one conveyor means is disposed adjacent the plate means and extends away therefrom whereby leaves severed by such head can be removed from the cutting area.

5. The leaf removing and cutter head assembly of claim 1 including at least two leaf removing and cutter heads disposed on opposite sides of the relative line of travel of stalks therepast whereby leaves about the entire circumference of a stalk can be removed therefrom.

6. The leaf removing and cutter head assembly of claim 5 wherein at least one conveyor means is disposed adjacent each leaf removing and cutter head, subject conveyors extending away from their respective leaf removing and cutter heads whereby leaves severed by the heads can be conveyed away from such heads.

* * * * *